United States Patent
Santamaria et al.

(10) Patent No.: US 9,881,280 B2
(45) Date of Patent: Jan. 30, 2018

(54) METHOD AND APPARATUS FOR SEARCHING FOR TEXT MESSAGES

(75) Inventors: Justin Edward Santamaria, San Francisco, CA (US); Bryan Prusha, Campbell, CA (US); Marcel Van Os, San Francisco, CA (US)

(73) Assignee: APPLE INC., Cupertino, CA (US)

(*) Notice: Subject to any disclaimer, the term of this patent is extended or adjusted under 35 U.S.C. 154(b) by 944 days.

(21) Appl. No.: 12/831,983

(22) Filed: Jul. 7, 2010

(65) Prior Publication Data

US 2011/0252023 A1    Oct. 13, 2011

Related U.S. Application Data

(60) Provisional application No. 61/321,830, filed on Apr. 7, 2010.

(51) Int. Cl.
*G06F 17/30* (2006.01)
*G06Q 10/10* (2012.01)
*H04M 1/725* (2006.01)

(52) U.S. Cl.
CPC ..... *G06Q 10/107* (2013.01); *G06F 17/30613* (2013.01); *H04M 1/72552* (2013.01)

(58) Field of Classification Search
USPC .......................................... 707/723
See application file for complete search history.

(56) References Cited

U.S. PATENT DOCUMENTS

| | | | |
|---|---|---|---|
| 6,714,793 B1* | 3/2004 | Carey et al. | 455/466 |
| 2005/0289109 A1* | 12/2005 | Arrouye et al. | 707/1 |
| 2006/0075044 A1* | 4/2006 | Fox et al. | 709/206 |
| 2007/0033169 A1* | 2/2007 | Friedman | 707/3 |
| 2011/0099584 A1* | 4/2011 | Rodriguez | 725/51 |

OTHER PUBLICATIONS

"iPhone User Guide for iPhone OS 3.1 Software", (c) 2009 Apple Inc., (2009), 217 pgs.

* cited by examiner

*Primary Examiner* — Amresh Singh
(74) *Attorney, Agent, or Firm* — Ronald Fernando

(57) ABSTRACT

A method is performed on a handheld device that involves receiving a search term and searching through stored text message information of multiple text messages for the search term. A listing of text message conversations are listed on the display where each listed conversation has at least one text message whose text message information was found to include the search term. And, in response to a user selection of one of the conversations, a sequence of text messages within the one selected conversation is displayed.

7 Claims, 13 Drawing Sheets

METHOD AND APPARATUS FOR SEARCHING FOR TEXT MESSAGES

PRIORITY

This application claims the benefit of provisional U.S. Patent Application No. 61/321,830, filed Apr. 7, 2010.

FIELD OF INVENTION

The field of invention pertains to handheld device interface tools generally, and, more specifically, to a method and apparatus for searching for text messages on a handheld device.

BACKGROUND

Apple, Inc. of Cupertino is well known for a popular handheld device named the "iPhone". FIGS. 1A-1D show one operational feature of a currently available iPhone. According to the approach of FIGS. 1A-1D, when the iPhone is displaying its home display 101, which includes displays of respective icons 102a-102i for the applications ("apps") installed on the iPhone (FIG. 1A), the user may fetch the Springboard search engine (FIG. 1B) by scrolling leftwise to the leftmost screen. A search on the particular text that is entered into the Springboard search engine (e.g., "Dan") will reveal hits on pertinent entries (FIG. 1C). Generally, "hits" are listed in order according to the following stratagem: contact hits before music/video hits; music/video hits before note hits; note hits before calendar hits. Selection of one of the listed hits opens up a corresponding file. Thus, for example, if a contact hit is selected, standard contact information for the particular individual is presented along with various buttons for further options (FIG. 1D). In the case of displayed contact information (as observed in FIG. 1D), one of these buttons 103 opens up a text dialog window for sending a text message to the individual associated with the contact file.

FIGS. 2A-2C show another operational feature of a currently available iPhone. When the iPhone is displaying its home display 201 of respective icons for the applications installed on the iPhone (FIG. 2A), the user may launch the text messaging application by tapping on the text messaging icon 202a. The text messaging application can be used to send content, such as text, using a short messaging service provided by cellular telephone carriers such as AT&T. If there is no recently received text message, the text messaging application initially displays a list (FIG. 2B) of the individuals with whom the user has had text messaging conversations in time order (i.e., the individual with whom the user has most recently received/sent text messages, from/to is listed before the individual with whom the user had a conversation with most recently before the most recent conversation, etc.). A particular individual can be found by scrolling down through the listed individuals until the desired user is found. By tapping on the individual's name, a text messaging dialogue window is opened (FIG. 2C) that includes a previous exchange with the user and an entry field 203 for entering words to send via text messaging to the individual.

Notably, as observed above, currently released iPhones do not permit the user to enter a text-based search, the result of which permits the user to readily retrieve a desired text message conversation.

Searches of textual information at least, however, are known in the art. For instance, according to one known approach, a letter sequence search may be performed for a text document (such as an HTML document retrieved from the Internet or a document rendered in a word processing application). After the user enters the term to be searched, a portion of the document that includes the first "hit" (starting from the beginning of the document) is rendered to the user with the hit upon search term being highlighted to the user. The user can then jump to the next hit in the document (e.g., by hitting a user interface button). In this case, a next portion of the document that surrounds the next hit is rendered to the user.

Another known approach permits a user to search for a key letter sequence within a group of documents. Documents having the searched for term are displayed to the user. After the user selects one of the documents, the selected document is presented to the user.

Another known approach permits a user to search his/her email records for a specific letter sequence. Emails having the sought-for term are displayed to the user. After the user selects one of the emails, the selected email is displayed with a reply button that, when activated, launches a draft outbound email destined for the sender of the selected email.

BRIEF DESCRIPTION OF THE DRAWINGS

The present invention is illustrated by way of example and not limitation in the figures of the accompanying drawings, in which like references indicate similar elements and in which:

FIG. 7 shows an architecture that the methods of FIGS. 4 and 6 may be implemented with;

DETAILED DESCRIPTION

FIGS. 3A-3H and 5A-5E pertain to improved methods for accessing a text messaging conversation. A text messaging conversation is a set of text messages between a user of a device and another user of another device (e.g., a sequence of text messages (such as a time ordered set of all text messages) between a user of a first device and a user of a second device). Here the term text message is understood to be a non-email messaging communication such as the types of communications delivered with the Short Messaging Service (SMS) protocol and/or Multi Media Messaging (MMS) protocol. Text messaging conversations are also kept and/or displayed differently than email exchanges. That is, a text messaging conversation is automatically kept and/or displayed as a set (e.g., a sequence) of text messages between a user of a device and another user of another device, whereas, emails are nominally kept and/or displayed as individual messages rather than a set or sequence thereof.

A text messaging conversation can have an unbounded time period between its initial and its most recent messages. Moreover, any and all text messages between two devices (e.g., two different phone numbers) may be included in the text message conversation between the two devices, and, in typical applications, users cannot create a parsed or redacted version of the conversation.

Figure 1A:
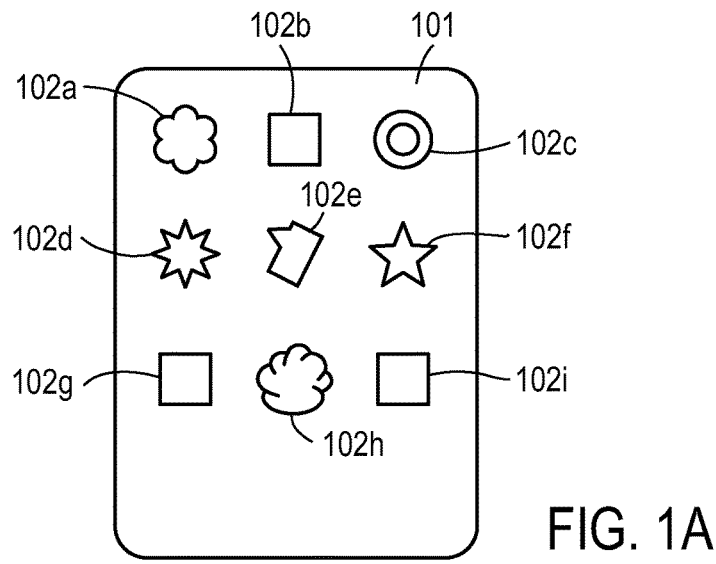
FIGS. 1A-1D (prior art) pertain to a first conventional method for accessing a text messaging conversation.
Figure 1B:
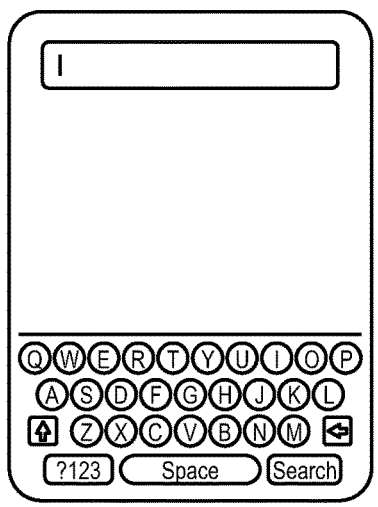
Figure 1C:
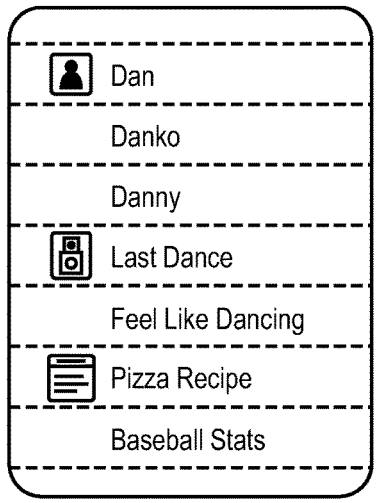
Figure 1D:
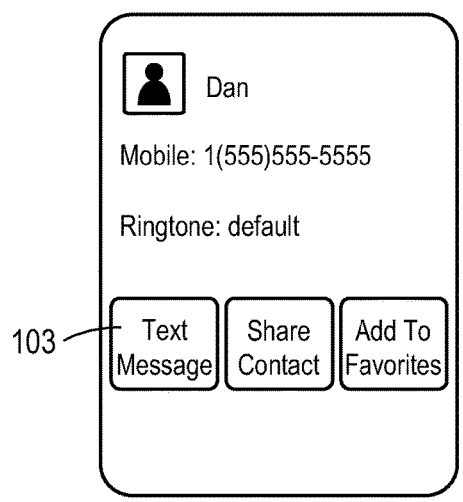
Figure 2A:
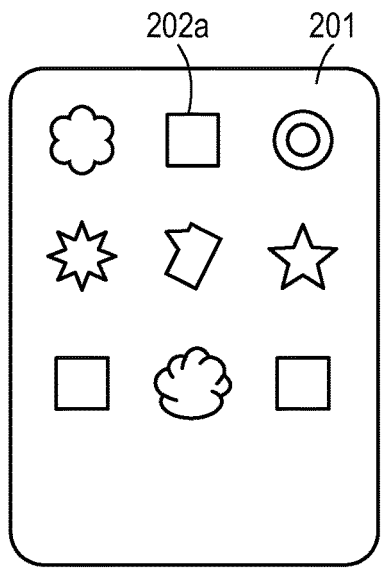
FIGS. 2A-2C (prior art) pertain to a second conventional method for accessing a text messaging conversation.
Figure 2B:
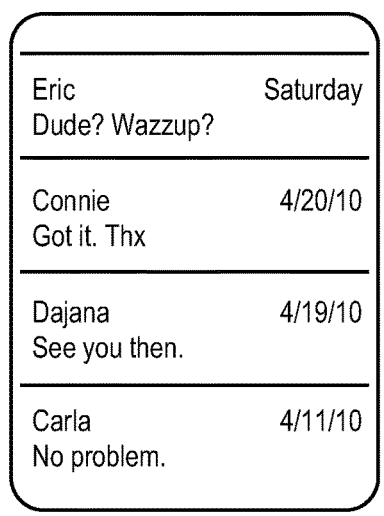
Figure 2C:
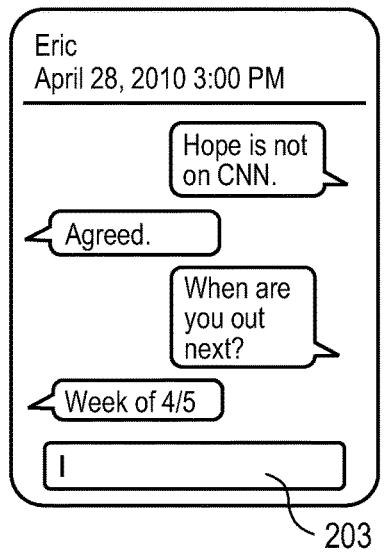
Figure 3A:
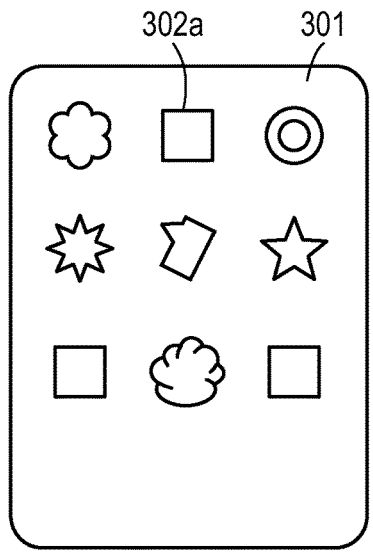
FIGS. 3A-3H pertain to a first method for searching for text messages on a hand held device.

FIGS. 3A-3H, using an iPhone interface as an example, show a first embodiment of searching for a text messaging conversation with a text based search. FIG. 3A shows a home display 301 in which a handheld device is displaying respective icons of applications installed on the device. Notably, alternative home displays may exist such as a display of the date and/or time, a personal digital photograph or a prompt for a user ID and/or password. From the home display, in the example of FIG. 3A, a text messaging application can be launched by tapping on the text messaging application icon 302.

Figure 3B:
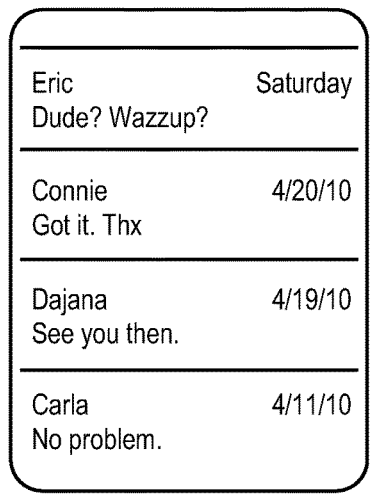

As observed in FIG. 3B, the following screen display lists the individuals with whom the user has most recently has had conversations with in time order (e.g., an individual of a more recent conversation is listed above an individual of a later conversation). Alternatively, the following screen display after the user launches the text messaging application may be a display of the user's most recent text messaging conversation (e.g., showing a sequence of conversations between the user and another individual including date and time stamps with each message).

Regardless as to the specific display that first appears after the user launches the text messaging application, the user is able to initiate a text-based search within the text messaging application. According to just one possibility, the user is able to launch a displayed search tool 303 by scrolling to the left to the leftmost screen. A wealth of other possible approaches also exist such as: a button or tab for bringing up the search tool is displayed on the first screen, the search tool is displayed on the initial text messaging application screen, etc. The user then enters the one or more words (FIG. 3C) that the user expects will flag a sought for conversation (in the example of FIG. 3C, the user taps on a text input field window 302 to cause a keyboard to be displayed). As observed in FIG. 3C, the user intends to perform a search on the word "Dan".

According to one embodiment, the handheld device stores previous conversations and meta data linked to the conversations to enable the search. For example, stored meta data may include, for each individual message within a conversation, the message's date, time, sender, receiver and substantive content of the messages themselves such as "non-stop" words within the body of the message (non-stop words are the words of a message absent articles or prepositions such as "the", "of", "at", "a", etc.). Using the search words entered by the user, the handheld device searches for individual messages that "hit" or match on the search term(s). Here various search strategies/algorithms known to those of ordinary skill may be utilized to recognize, count and/or rank the resulting hits.

Figure 3C:
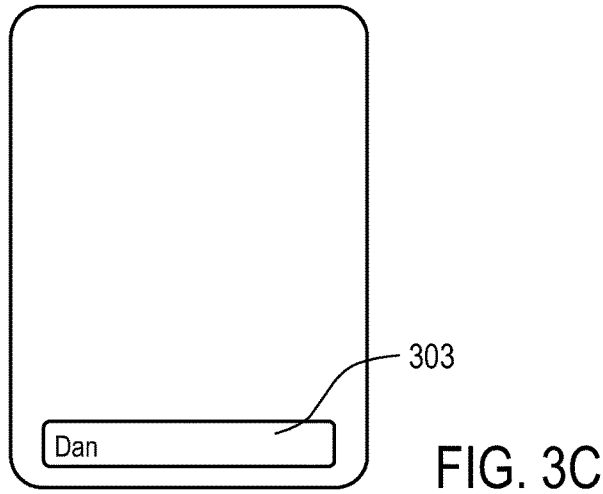
Figure 3D:
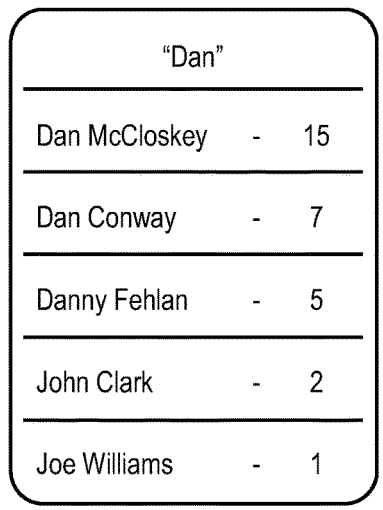

FIG. 3D shows an exemplary search result for the search term "Dan" observed in FIG. 3C. As observed in FIG. 3D, the results are presented in a ranked order where a conversation having more hits is listed higher than a conversation having less hits. Here, for example, each hit in the respective meta data of a conversation's constituent messages is counted and a sum total of all hits within the meta data of the constituent messages is calculated for the conversation as a whole. Conversations having more hits are then ranked above conversations having less hits. As observed in the embodiment of FIG. 3D, the sum total for each conversation is also displayed along with its conversation.

A discussion of some pertinent aspects of the search is warranted. Because the search process counts hits within a conversation's meta data, with the search term "Dan", the conversations that are apt to be ranked above most others are those conversations with individuals with whom the user frequently texts and have a name with the letter sequence d-a-n. That is, there exists a relatively large number of messages within the conversation, and, each message within the conversation has meta data with the word sequence d-a-n in either the sender meta data or the receiver meta data. Such a circumstance is apt to produce a large number of hits for a particular conversation. As such, note that FIG. 3D shows individuals having the letter sequence d-a-n in their respective names being ranked higher than other individuals who do not have the letter sequence d-a-n in their respective names.

Also worthy of note is that lower ranking conversations are those individuals who do not have the word sequence d-a-n in their respective names, but, the content of the messages between the user and such individuals include the word sequence d-a-n (for instance, if the user and such individuals discussed a person named "Dan"). These features are, of course, exemplary based on what is apt to be a likely but not absolute scenario. It is entirely possible that another user of another handheld device may have a tremendous number of conversations with someone who does not have the letter sequence d-a-n in their name, but, the messages themselves frequently include the letter sequence d-a-n, thereby causing this particular conversation to be ranked above all others.

Searches for other than an individual's name are also possible. For instance, because the day and time of each message is kept in meta data, a search on "March 5"—for example—would return those conversations held on March 5, with those conversations having more messages sent/received on March 5 being ranked ahead of those conversations having less messages sent/received on March 5. Of course, if the user actually discussed March $5^{th}$ in the body of his/her messages with various individuals, the conversations of such individuals would also be included in the search result.

Likewise, subject matter based searches are also possible. For example, if the user types "St. Patrick's Day" in the search tool, those conversations in which the user actually discussed St. Patrick's Day with another individual will be listed in the search result.

Various other features may also be incorporated in the design of the search tool such as not including the identity of the sender in the meta data for sent messages or the identity of the receiver in the meta data for received messages (which would avoid a hit on every message kept by the handheld device if the user attempted to search on a word sequence that was within the user's own name). Also, the search tool may be designed to rank conversations having identical hit counts such that a conversation having a more recent message is ranked higher than a conversation whose most recent message is later in time.

Further still, if a messaging technology permits a conversation between the user and more than one individual, such conversations may be identified separately from conversations between the user and just one of these individuals, or, may be lumped into conversations between the user and just one of these individuals.

For example, if the user has had a conversation with just Dan and a conversation with Dan and Rob, a search on the search term "Dan" may: 1) tabulate separate total hit counts for the "Dan" conversation and the "Dan and Rob" conversation; and, 2) display these conversations separately in the search results. Alternatively: 1) hits from the Dan and Rob conversation may be added to the total hit count for both the singleton Dan conversation and the singleton Rob conversation; and, 2) the Dan and Rob conversation is not individually displayed in the search results. In an even further embodiment, the user may be given the option as a search tool setting as to which option to take.

As a further alternative embodiment, the primary ranking criteria may be time based (e.g., between a first conversation whose most recent message is more recent than the most recent message of a second conversation, the first conversation is ranked ahead of the second conversation). Even further, the user may be given the option as a search tool setting as to which primary search criteria is to be used (hit count or time based).

Figure 3E:
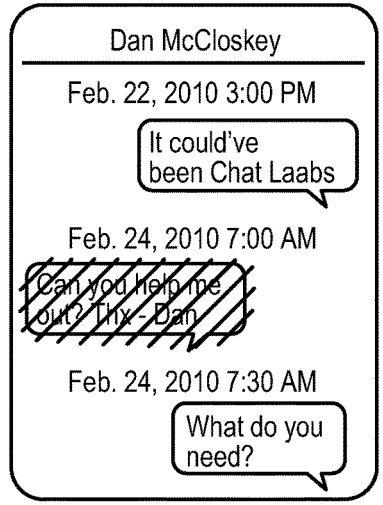
Figure 3F:
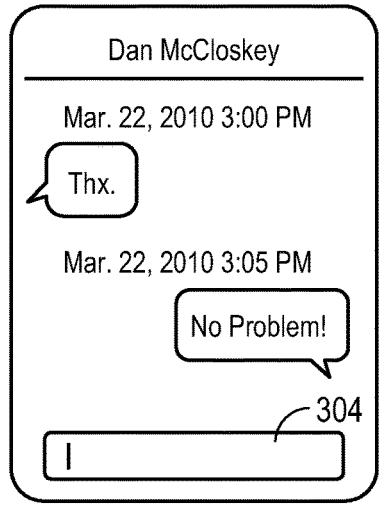

FIGS. 3E and 3F pertain to one embodiment for presenting the particular conversation that the user selects from the search results presented in FIG. 3D. According to this particular example, when the user selects the "Dan McCloskey" conversation of FIG. 3D, the handheld device responds by first displaying the most recent text message having the search term in the body of the message (if any). The particular message can be visually highlighted or otherwise presented to give it special notice above and beyond the other displayed messages. This display is shown in FIG. 3E. Then, the display can proceed to visually scroll down from the highlighted message to the conversation's most recent message, and, a feature 304 for initiating a new message (e.g., a text entry field for entering the new message's text) (FIG. 5F). In the example of FIG. 3F, when the user taps on the text entry field 304, a keyboard is displayed.

Figure 3G:
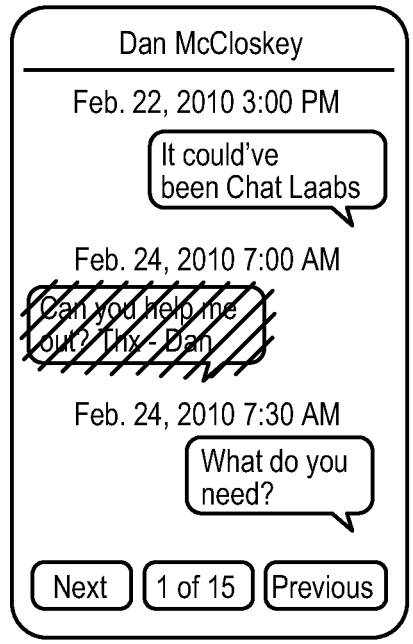
Figure 3H:
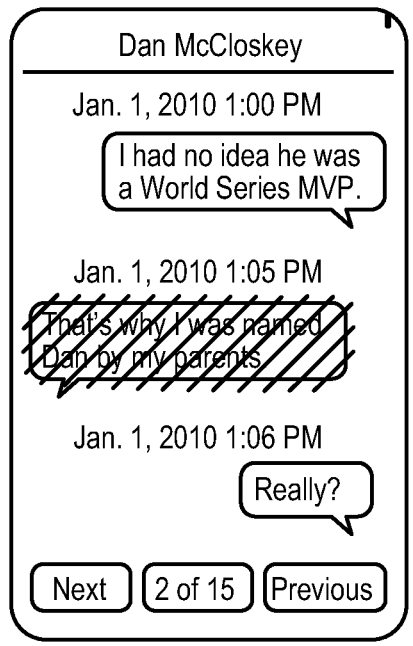

FIGS. 3G and 3H show an additional feature that may be used, at least, in combination with the feature of FIG. 3E. Notably, a set of "Next" and "Previous" buttons are displayed in the user interface. Recalling from an example discussed with respect to FIG. 3E that the most recent text message to include the searched for term can be initially displayed and highlighted when the user selects a particular conversation, using this same background with respect to FIG. 3G, if the user selects the "Previous" button, the display will jump backwards in time relative to the highlighted message to show the next message to include the term "Dan". An exemplary result is observed in FIG. 3H. Of course, if the user selects the "Next" button, the display will jump forward in time relative to the highlighted message to show the next message to include the term "Dan". Thus, if the user taps the "Next" button from FIG. 3H, a display that includes the highlighted message of 3G will appear.

Note that the display may also show where the displayed message having the search term ranks in the sequence of messages having the search term. Although not shown, the display may also include a text entry field (like field 304 of FIG. 3F) or other displayed feature to launch a next message in the conversation. The display may or may not automatically scroll to the last message in the conversation (as discussed with respect to FIG. 3F).

Notably, according to one embodiment, as discussed at length above, when the user enters a search term, the entire collection of stored text messages can be searched and the conversations containing hits are displayed. When the user selects a particular conversation, messages from the conversation are called up from storage (e.g., system memory and/or non volatile memory/storage). However, the device may be designed to limit the number of messages that are called up from storage and placed into cache, e.g., because calling up all messages in a conversation having a large number of messages would consume to much cache space and/or consume too much time. Here, it is pertinent to revisit a distinction between email and text messages. Notably, that text messages are kept track of, displayed and/or stored as potentially long strings of messages between the device and another device (e.g., the text messages that are kept track of for a conversation are unbounded in time such that all messages between the device and another device are kept as a single cohesive unit (e.g., file)). Because the string of text messages within a single conversation may be substantial, there may be performance issues if all messages within a single conversation are called up from storage and placed into cache.

According to an implementation that displays Next and Previous buttons, when the user selects a particular conversation, less than all the messages within the conversation may be retrieved from storage and put into cache, and, moreover, the specific messages that are called up include those messages that include the sought for term. In a further embodiment, a set of neighboring messages in the sequence of messages above and below each message having a hit are also called up and cached, so that, if the user (through the Next and/or Previous buttons) jumps to a particular message having the sought for term a sequence of messages immediately before and after the message can readily be retrieved from cache and displayed on either side of the message. This set of messages may extend well beyond the set of messages that are simultaneously displayed with a message having the search term so that, for instance, the user can scroll ahead or backwards in time relative to the message having the search term (e.g., up to and including the next/previous message having the search term). According to a further embodiment, the exact algorithm for calling up messages from cache may attempt to extend this set of messages beyond a default value if sequential messages having hits can be fluidly connected with all messages between them if the number of these messages does not exceed some limit.

Figure 4:
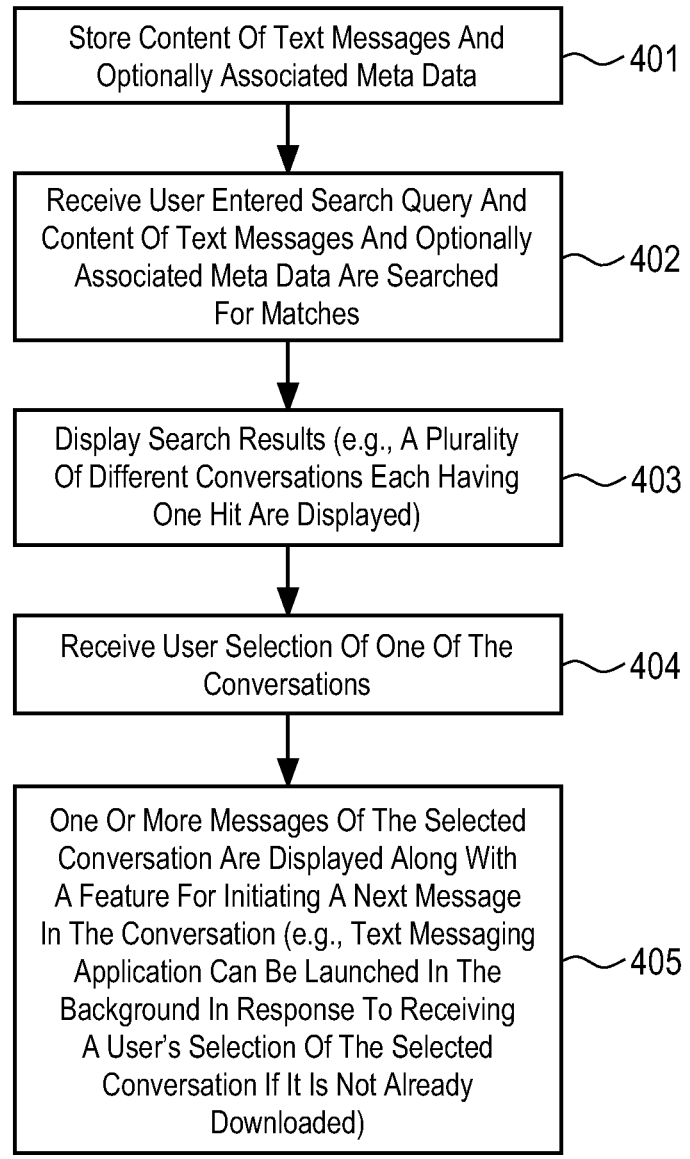
FIG. 4 shows a method, an embodiment of the method is presented in FIGS. 3A-3E.

FIG. 4 presents a flow diagram for an embodiment of a process that can provide the user interface displays of the example of FIGS. 3A-3E. According to the flow diagram of FIG. 4, a handheld device engages in text messaging activity with various individuals and stores the associated text messages (both incoming and outgoing) and (optionally) associated meta data 401. Subsequently, a user of the handheld device enters a search query 402. The body of the respective text messages (and optionally associated meta data such as date/time of transmission/reception, etc.) are searched for matches 402. The search results, such as a plurality of different conversations each having at least one hit, are then displayed 403 (e.g., with conversations having more hits being listed ahead of conversation having less hits, or, based on time order). The user then selects one of the conversations 404. In response, messages of the conversation are displayed along with some feature (e.g., a button, a prompt, a text entry field, a tab, etc.) to initiate the construction of an outgoing text message to an individual associated with the conversation 405. As described in the example of FIGS. 3A-3E the text messaging application was launched prior to the performance of a methodology as observed in FIG. 4. However, notably, as alluded to further below, the search may be performed before the text messaging application is launched, and, the selection of the text messaging conversation may trigger the launching of the text messaging application.

FIGS. 5A-5E provide another exemplary process for obtaining the records of a text messaging conversation by way of a search performed on a computing system such as a handheld device. As a point of contrast, whereas the example of FIGS. 3A-3E was performed from within a text messaging application, the example of FIGS. 5A-5E is performed outside a text messaging application such as from the handheld device's home display environment (e.g., where icons of the applications loaded on the handheld device are presented).

Figure 5A:
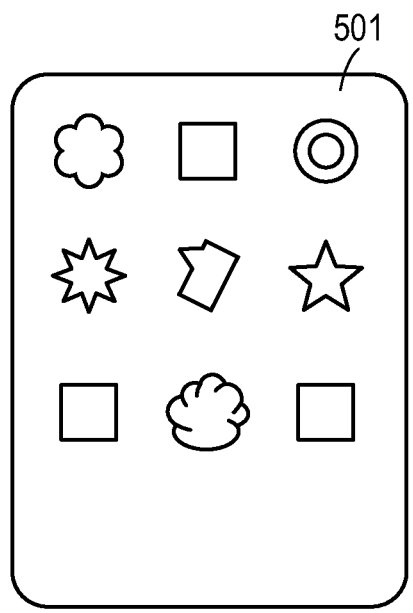
FIGS. 5A-5E pertain to a first method for searching for text messages on a hand held device.

FIG. 5A shows an exemplary home display of a handheld device in which icons of various application of the handheld device are displayed. From the home display of FIG. 5A, the user is able to bring up a search tool as observed in FIG. 5B. In the case of an iPhone, the search tool is a Springboard search tool that the user can fetch by scrolling to the left most screen from the base display. Of course, in other environments, the user may fetch a search tool by other means such as scrolling in different directions, hitting a button or tab or icon, or, the search tool may already be displayed in some form.

Figure 5B:
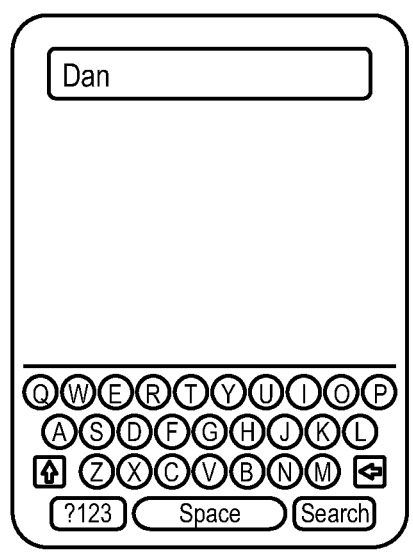

As observed in FIG. 5B, the user has entered the search term "Dan" into the search tool. In response, the handheld device searches through meta data for files of a number of different applications on the device. For example, the handheld device searches in meta data files not only for text messages within a text messaging application, but also, emails within an email application, music/video files within a music/video player application, note files within a notes application, to do files within a to do application and calendar files within a calendar application.

Figure 5C:
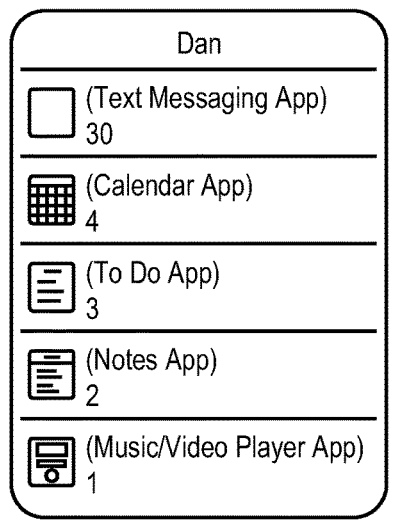

FIG. 5C shows an exemplary search result for the search term "Dan." Notably, applications having more "hits" in the meta data are ranked ahead of applications having less hits in the search results. As observed in FIG. 5C, the search results may also include each listed application's respective icon and number of hits.

Figure 5D:
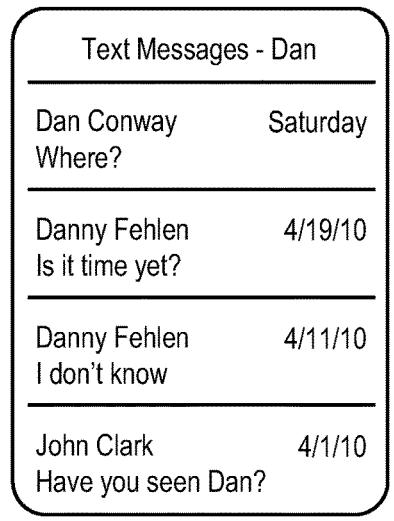
Figure 5E:
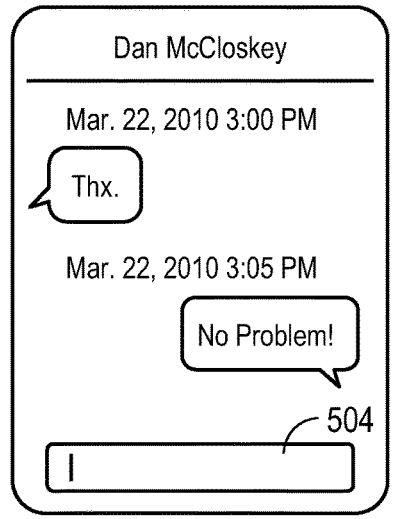

FIG. 5D shows the next screen when the user selects the text messaging application from FIG. 5C. Here, the various text messages whose meta data registered a hit are simply listed in time order. If the most recent message with the individual for whom the search was performed is not immediately visible, the user can scroll down until it appears. If the user taps on this message, the most recent message(s) in the conversation will be displayed along with a feature 502 for initiating a next message in the conversation (FIG. 5E).

Note that, comparing FIG. 3D with FIG. 5D, different search result forms are presented for text messages depending on which environment the search is performed from. That is, according to the example of FIGS. 3A-3E, if the search is performed from the text messaging application, conversations are presented as the search results in ranked order based on the number of hits for the search term (as observed in FIG. 3D), whereas, according to the example of FIGS. 5A-5E, if the search is performed from the home display, actual text messages that hit on the search term are presented in time order as the search results (as observed in FIG. 5D). Conceivably, in an alternate embodiment, the search result forms could be swapped. That is, the display of FIG. 5D could follow from FIG. 3C and the display of FIG. 3D could follow from FIG. 5C. Likewise, in other alternative embodiments, the search result forms could be the same irrespective of which environment the search tool was triggered from.

In an embodiment, if the user were to instead select any of the other applications other than the text messaging application from FIG. 5C (such as any of the email, music/video, to do, notes or calendar applications), search results for the selected application would instead be displayed. Also, it is worthwhile to note that the search tool (or at least instance of a search tool) that presents a different search result form than the form presented from the text messaging application, depending on designer choice, may be reachable from the home display only, other applications and the home display, or, one or more other applications and not the home display.

Figure 6:
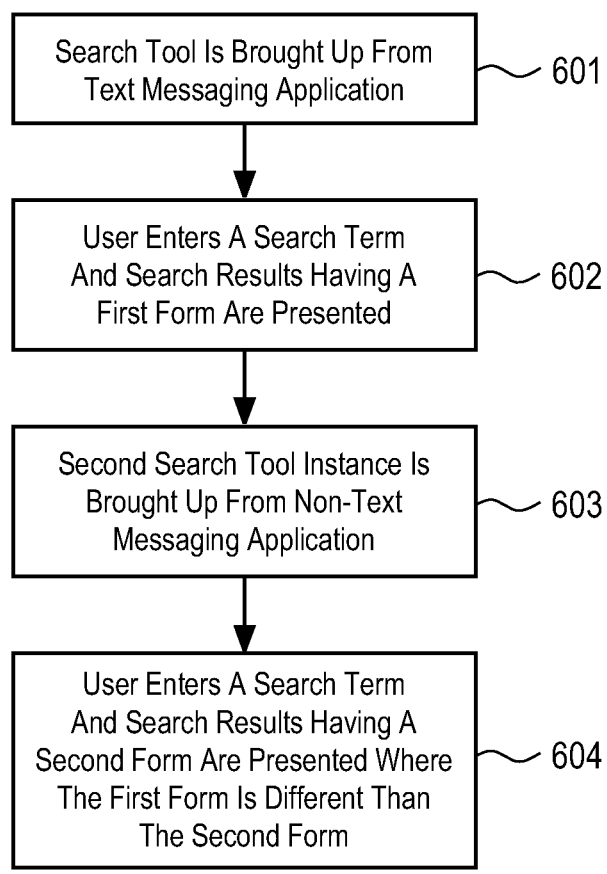
FIG. 6 shows a method, an embodiment of the method is presented in FIGS. 5A-5E.

FIG. 6 shows a flow diagram for a process described above. According to the process of FIG. 6, a first search tool is brought up by the user from a text messaging application environment on a handheld device 601. In response to the user's entry of a search term, a search result having a first form is presented 602. In a non text messaging application environment, a second instance of a search tool is brought up by the user 603. In response to the user's entry of a search term, a second search result having a second form is presented, where, the first and second forms are different from one another 604.

In an embodiment, all of the teachings above could be incorporated into an email application as opposed to (or along with) a text messaging application. That is for instance, referring briefly back to FIG. 3E, FIG. 3E may represent hits on email exchanges between the user and other individuals. When a user selects a particular "email" conversation, a string of consecutive emails are then displayed akin to FIG. 3F. The other teachings described above may be likewise be read with emails in mind rather than text messages.

Figure 7:
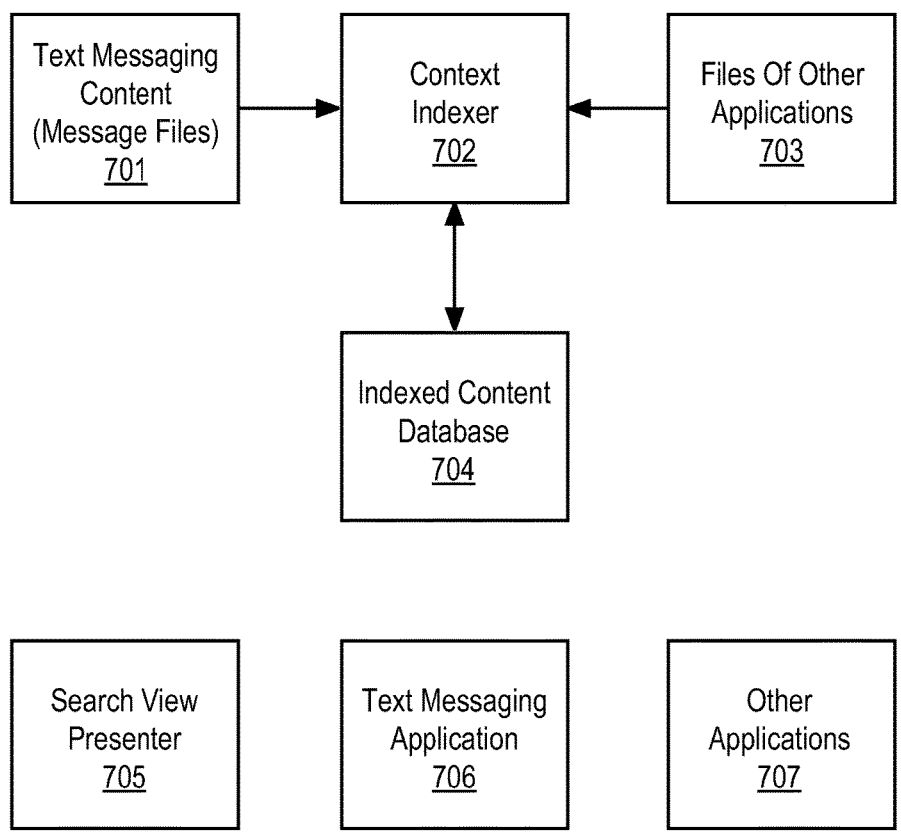

FIG. 7 shows an architecture for implementing the user experiences discussed above. The architecture includes stored text messaging content 701, a content indexer 702, the stored content of other applications 703 (such as stored files of notes, to do items, calendars, music/video items, etc.), an indexed context database 704, a search view presenter 705, a text messaging application 706 and the other applications 707 associated with stored content 701. Here, the search view presenter 705 controls the display of the search tool(s) and their corresponding results. The content indexer 702 processes the content of a stored text message file 701 or stored file of another application 702 and builds the index 704 accordingly. The index may be viewed as the meta data that is searched for the various files. The content storage areas 701 and 703 may be implemented with semiconductor memory including volatile memory during run time with backup into non volatile memory on power down. Components 702, 704 and 705 are typically implemented with program code that is executed by a processing core of some kind, but, may be enhanced/accelerated (or completely implemented) with semiconductor logic circuitry.

Figure 8:
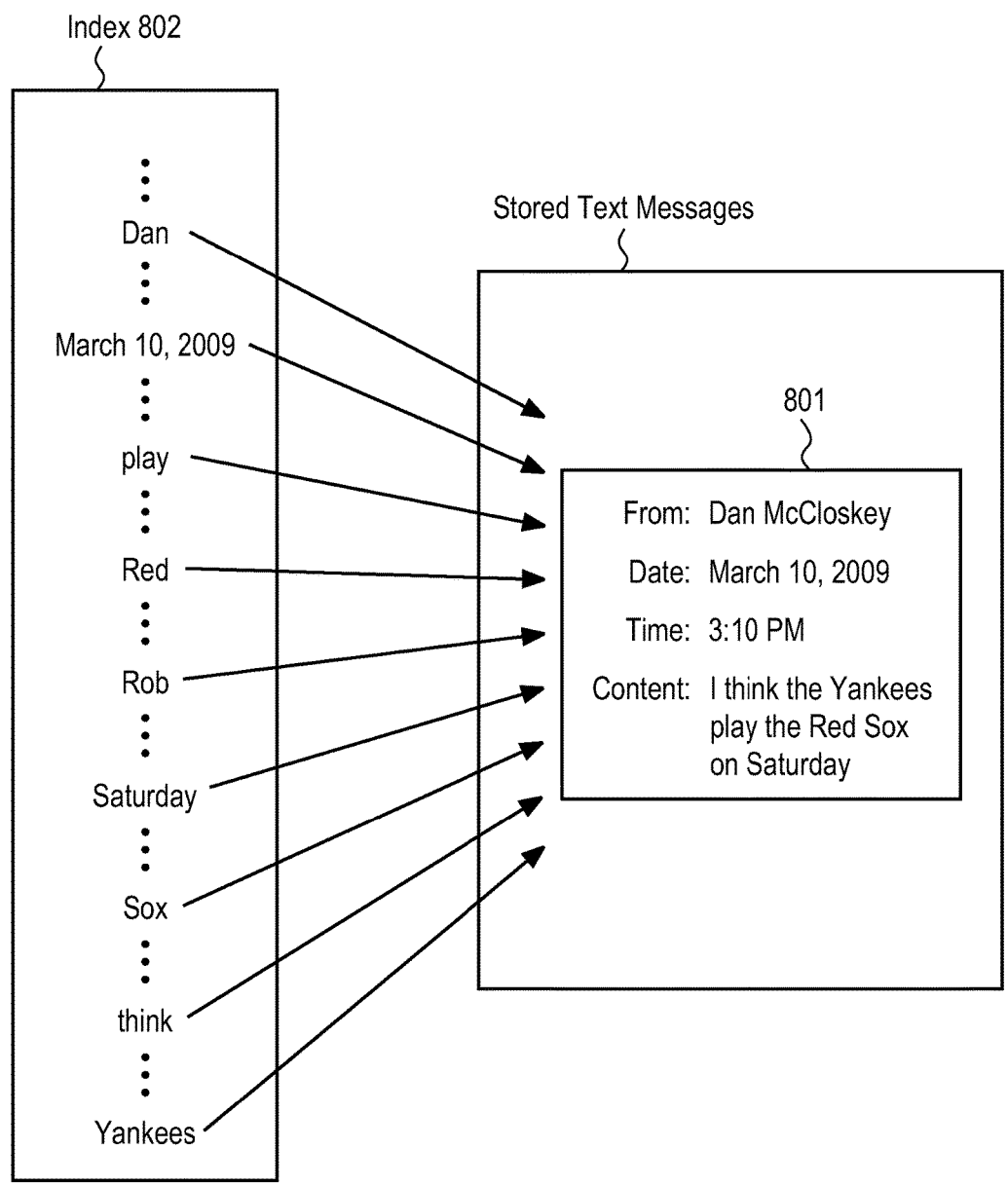
FIG. 8 shows an exemplary index linked to an exemplary file.

An indexed content database is analogous to the index at the back of a book. Like a traditional book index that alphabetically links words to their respective pages in a book, an indexed content database of a handheld device alphabetically links words to their respective files. FIG. 8 demonstrates an example. FIG. 8 shows the contents of an exemplary text message file 801 and the index entries for the text message 802. Notably, each of the index entries is linked to the file 801 such that a search hit on one of the index entries automatically directs the search process to the text message file 801.

Various indexing approaches may be attempted. According to a first approach, separate indexes are kept for separate applications. Thus, for example, when the search tool is launched from the text messaging application (as described with respect to FIGS. 3A-3E) only the text messaging index is searched, whereas, when the search tool is launched from the home display (as described with respect to FIGS. 5A-5E) all of the indexes are searched (e.g., the text messaging index, the to do index, the calendar index, the notes index, the music/video index, etc.).

Alternatively, a single index may be maintained with entries being tagged or keyed as to which application they are associated with. For instance, entries 802 of FIG. 8 would be tagged or keyed as belonging to the text messaging application, and, be blended with other key words from other applications in the single index, where, the other key words are likewise tagged/keyed to their particular application(s). In this case, only those keys tagged/keyed to the text messaging application would be searched if the search was initiated from the text messaging application, and, all key words (or at least the key words tagged/keyed to those applications needing to be searched) are searched if the search is raised from the base display. Search tool databases also need not be implemented with an indexing structure.

Although the above described features were described in reference to a handheld device such as a smartphone, these same features may be incorporated onto other computing systems (mobile or otherwise) such as tablet computers (e.g., Apple, Inc.'s iPad), netbook computers, notebook computers, laptop computers, personal desktop computers, etc.). In cases where the above description described user interoperability in terms of a touch screen, for systems not having a touch screen, such interoperability could be readily achieved with some form of cursor control (e.g., as with a mouse) and keyboard keystrokes.

Figure 9:
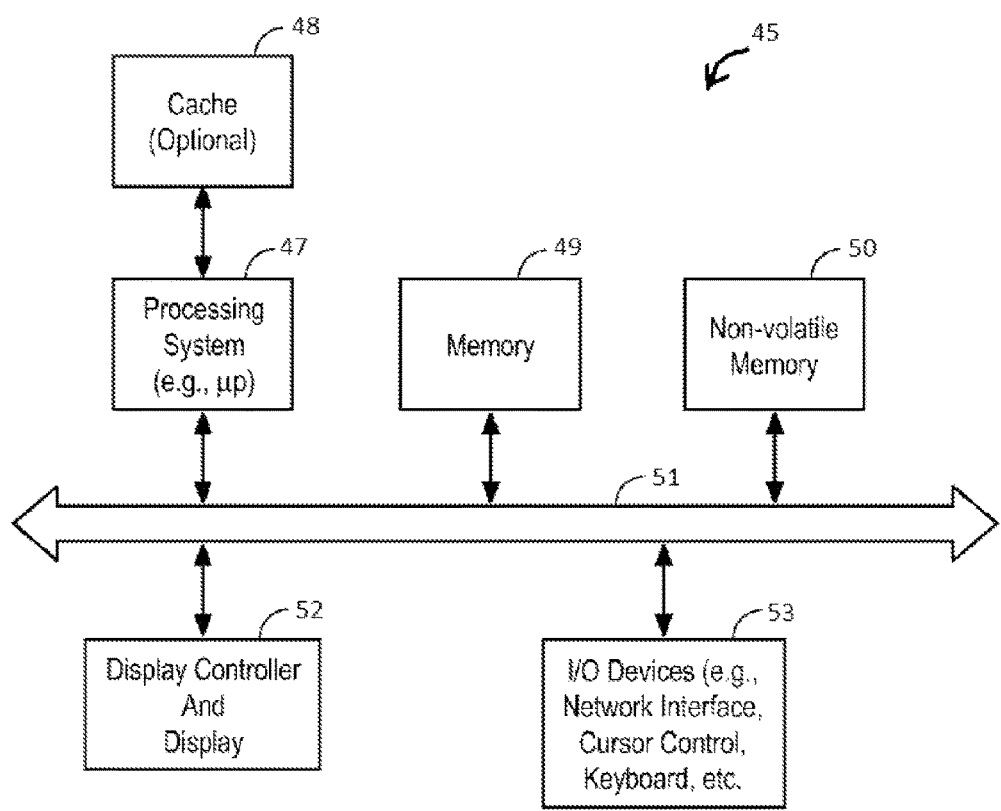
FIG. 9 shows an exemplary handheld device architecture or other data processing system.

FIG. 9 shows an exemplary architecture for a computing system such as a handheld device. As shown in FIG. 9, the computing system 45, which may also be referred to as a data processing system, includes a bus 51 which is coupled to a processing system 47 and a volatile memory 49 and a non-volatile memory 50. The processing system 47 may include a processing core which is coupled to an optional cache 48. The bus 51 interconnects these various components together and also interconnects these components to a display controller and display device 52 and to peripheral devices such as input/output (I/O) devices 53 which may include a touchscreen, network interfaces, and other devices which are well known in the art. Typically, the input/output devices 53 are coupled to the system through input/output controllers. The volatile memory 49 is typically implemented as dynamic RAM (DRAM) which requires power continually in order to refresh or maintain the data in the memory. The nonvolatile memory 50 is typically a magnetic hard drive or a flash semiconductor memory, or a magnetic optical drive or other types of memory systems which maintain data (e.g. large amounts of data) even after power is removed from the system. Typically, the nonvolatile memory 50 will also be a random access memory although this is not required.

While FIG. 9 shows that the nonvolatile memory 50 is a local device coupled directly to the rest of the components in the data processing system, it will be appreciated that the present invention may utilize storage which is remote from the system, such as a network storage device which is coupled to the data processing system through a network interface. The bus 51 may include one or more buses connected to each other through various bridges, controllers and/or adapters as is well known in the art.

It will be apparent from this description that aspects of the present invention may be embodied, at least in part, in software. That is, the techniques may be carried out in a handheld device in response to its processor/processing core, executing sequences of instructions contained in a machine readable storage medium such as a memory (e.g. memory 49 and/or memory 50). In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the processing system 47.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A handheld electronic device, comprising:
    a touch display;
    a digital processing unit;
    non volatile memory having stored program code, wherein, when said digital processing unit processes said program code a method is performed, comprising:
        launching a text messaging application;
        launching a search tool instance from said text messaging application;
        displaying said search tool instance on said touch display and receiving a search term through said touch display by said first search tool instance;
        searching through meta data of text messages for said search term, the meta data of text messages being stored separately from the text messages, the text messages being stored in a plurality of files on the handheld electronic device;
        rendering a first search result on said touch display according to a first search result format, the first search result including a sequence of text messages retrieved from at least one file of the plurality of files;
        highlighting the at least one text message within said sequence of text messages, said at least one text message containing said search term; and
        providing an option to initiate a next text message through said text messaging application;
        wherein the text messages were received by the handheld electronic device through a short messaging service protocol or a multi media messaging protocol.

2. The handheld device of claim 1 wherein said first format includes a list of text message conversations each having at least one text message whose respective meta data includes said first search term.

3. The handheld device of claim 2 wherein said first format include one of the following:
    i) text message conversations having more hits of the search term are listed ahead of text message conversation having less hits of the search term;
    ii) text message conversations whose most recent text message is more recent are listed ahead of text message conversations whose most recent text message is less recent.

4. The handheld device of claim 1 wherein said meta data includes:
   sender name for received messages;
   recipient name for sent messages;
   date of message for sent and received messages;
   non stop words for sent and received messages.

5. The device of claim 1, wherein said method performed further comprises:
   ranking said listing of text message conversations.

6. The device of claim 1, wherein said method performed further comprises:
   displaying a most recently received text message within the sequence of text message while simultaneously displaying the highlighted at least one text message containing the search term.

7. The device of claim 1, wherein said method performed further comprises:
   displaying the most recent text message in the selected conversation having the search term, and thereafter displaying, automatically without user input after displaying the most recent text message in the selected conversation having the search term, the most recent text message in the selected conversation.

\* \* \* \* \*